US007014783B2

(12) United States Patent
St. Germain

(10) Patent No.: US 7,014,783 B2
(45) Date of Patent: Mar. 21, 2006

(54) FLOW SPLITTING WEIR

(75) Inventor: Darin St. Germain, Gilbert, IA (US)

(73) Assignee: USFilter Corporation, Warrendale, PA (US)

( * ) Notice: Subject to any disclaimer, the term of this patent is extended or adjusted under 35 U.S.C. 154(b) by 0 days.

(21) Appl. No.: 10/991,277

(22) Filed: Nov. 17, 2004

(65) Prior Publication Data

US 2005/0067357 A1 Mar. 31, 2005

Related U.S. Application Data

(62) Division of application No. 10/170,601, filed on Jun. 13, 2002, now Pat. No. 6,849,480.

(51) Int. Cl.
*B01D 24/24* (2006.01)

(52) U.S. Cl. ............... 210/807; 210/286; 210/456; 210/264; 210/790

(58) Field of Classification Search ............... 210/767, 210/807, 264, 283, 284, 285, 286, 456, 790
See application file for complete search history.

(56) References Cited

U.S. PATENT DOCUMENTS

| 3,134,735 | A | 5/1964 | Greenleaf |
| 3,282,432 | A | 11/1966 | Greenleaf |
| 4,537,687 | A | 8/1985 | Piper |
| 4,793,934 | A | 12/1988 | Thompson et al. |
| 6,849,180 | B1 * | 2/2005 | St. Germain ................ 210/264 |
| 2003/0230542 | A1 | 12/2003 | St. Germain |
| 2005/0067357 | A1 * | 3/2005 | Germain ..................... 210/807 |

OTHER PUBLICATIONS

United Stated Filter Corporation; Bulletin No. 6902-0398-50 entitled "General Filter CenTROL Conventional Gravity Filters in a Cluster Arrangement"; 1998, pp. 1-9(includes insert).

* cited by examiner

*Primary Examiner*—Robert James Popovics

(57) ABSTRACT

A method of minimizing head loss in a filter system including a plurality of drop pipes, a plurality of filter cells having a maximum influent level, and a distribution box having a maximum influent level, a base, and a plurality of distribution cells. The method includes positioning a first end of each of the plurality of drop pipes within one of the distribution cells such that the first end of the pipe is disposed within the distribution cell and defines a weir having a weir height. The method further includes positioning a second end of each of the pipes in fluid communication with one of the plurality of filter cells. The method also includes supporting the distribution box such that the maximum influent level of the filter cells is above the base of the distribution box and below the maximum influent level of the distribution box.

6 Claims, 4 Drawing Sheets

US 7,014,783 B2

FLOW SPLITTING WEIR

RELATED APPLICATION DATA

This is a divisional patent application of U.S. patent application Ser. No. 10/170,601 filed on Jun. 13, 2002 U.S. Pat. No. 6,849,180, which is fully incorporated herein by reference.

BACKGROUND AND SUMMARY OF THE INVENTION

The present invention relates to gravity filters, and particularly to gravity filters having multiple filter cells. More particularly, the present invention relates to gravity filters having multiple filter cells incorporating inlet flow splitting.

Conventional gravity filters typically employ multiple filter cells to allow cleaning of one filter cell while the other cells continue to operate. In a multi-cell arrangement, the total flow of influent to be filtered is typically split equally among the active cells. To facilitate this, the influent is pumped to an elevation well above the maximum influent level of the filter cells. The influent flows into a distribution box disposed above the filter cells. Weirs within the distribution box divide the distribution box into a plurality of distribution cells. Generally, the number of distribution cells is equal to the number of filter cells. Influent flows over the weirs to equally divide the flows between the distribution cells. The influent then flows out of each distribution cell and into the associated filter cell through a separate pipe or channel. Closing a valve in the pipe prevents flow of influent to a filter cell allowing a backwash cycle or maintenance to the cell.

As shown in FIG. 5, dividing the flow in a conventional filter system 10 requires that the influent be pumped to a level substantially higher than the filter cell maximum influent level 11 and then allowing the influent to flow past a weir 12 and into one of a plurality of pipes 15. The flow in the distribution box 20 is split at the weirs 12 before it enters each of the pipes 15. The head loss 17 is a measure of the difference between the maximum influent level in the distribution box 20 and the maximum level in the filter cell 11. To save on pumping costs, it is desirable to reduce the flow losses that accumulate in the flow splitting process.

Thus, according to the present invention a filter provides a plurality of filter cells, each filter cell including a bottom surface and at least one side surface and defining a maximum influent level. The filter also includes a distribution box including a base and at least one wall, the base and wall at least partially defining a distribution region therein. The filter further comprises a plurality of drop pipes, each pipe having a first end and a second end, the first end of each pipe extending into the distribution region, the first end defining a weir at a weir height. The second end of the pipe extends out of the distribution box and is in fluid communication with one of the plurality of filter cells.

The invention further provides a method of splitting a flow of influent between a plurality of filter cells. The method uses a distribution box and a plurality of drop pipes. The method comprises the steps of disposing a first end of each drop pipe within the distribution box. The method further includes positioning the first ends of each drop pipe at a weir height such that the first ends of the drop pipes define a plurality of weirs within the distribution box. The method further comprises disposing a second end of the pipe in fluid communication with one of the plurality of filter cells. The method additionally includes directing the flow of influent to the distribution box, and simultaneously splitting the flow and distributing the flow by passing a substantially equal portion of flow over each of the weirs, and passing the flow through the plurality of drop pipes to the filter cells.

In preferred embodiments, the distribution box is supported to provide a maximum influent level within the box that is between one inch and twenty-five inches above the maximum influent level within the filter cells. In addition, a plurality of baffles attach to the walls of the distribution box to define distribution cells. Each of the drop pipes extends into one of the distribution cells to define a continuous weir. An adjusting member coupled to the first end of each drop pipe allows the elevation of the weir to be positioned as desired. A valve, comprising a closure plate and actuator, is disposed above each pipe to close the pipe when the actuator moves the plate into the closed position.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
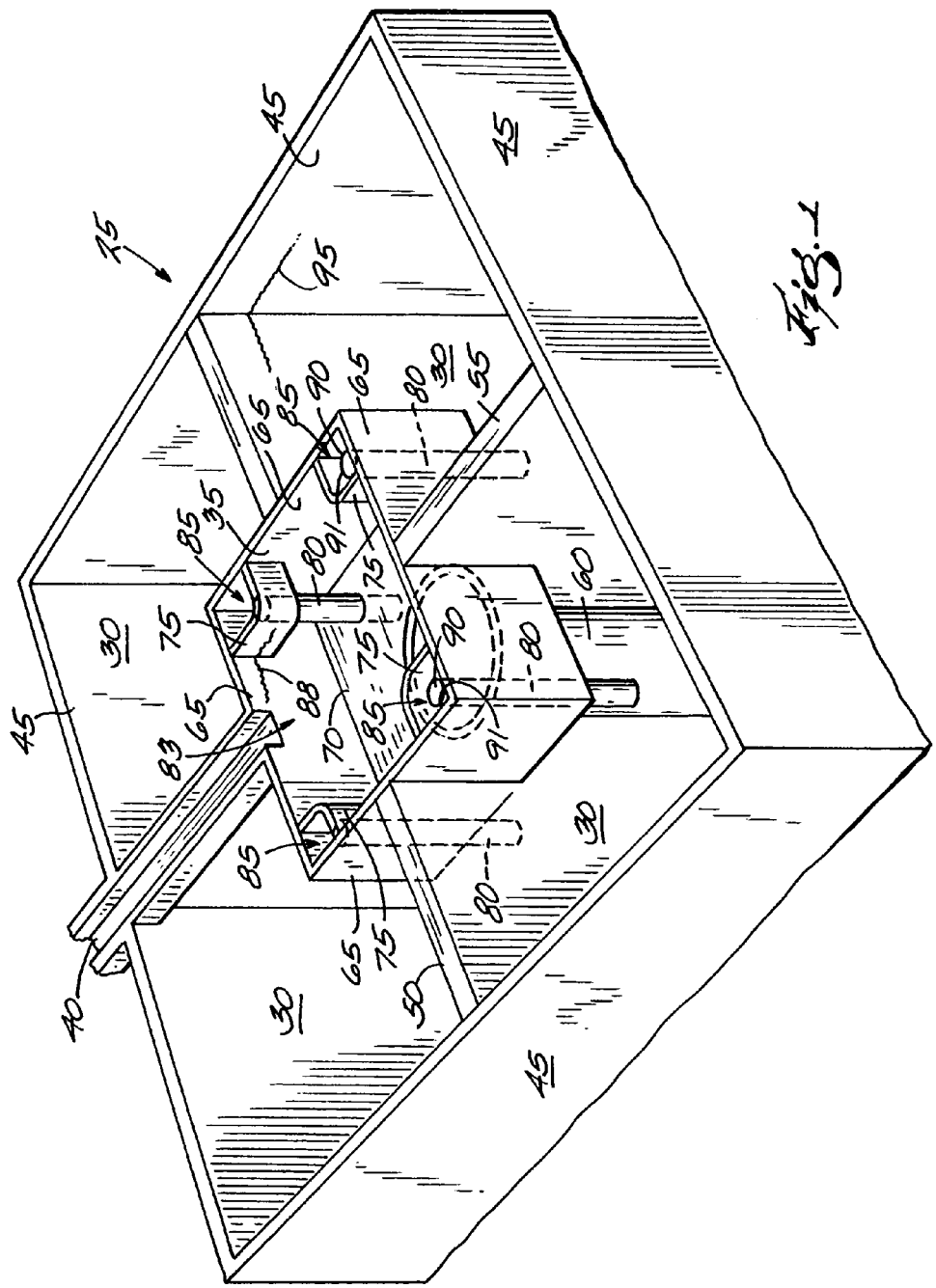
FIG. 1 is a perspective view of a filter in accordance with the present invention, including a distribution box.

Referring to FIG. 1, a filter 25, in accordance with the present invention, includes four filter cells 30, a distribution box 35, and an inlet flume 40. Four outer sidewalls 45 and a bottom surface (not shown) define a filter bed. A lateral wall 50 and a transverse wall 55 subdivide the filter bed 25 into the four filter cells 30. The bottom surface (again, not shown) is preferably manufactured from poured concrete or other construction materials, such as structural steel capable of supporting the weight of a control column 60, the distribution box 35, the filter media (not shown), and the influent. The outer sidewalls 45, transverse wall 50, and lateral wall 55 are preferably manufactured from poured concrete, steel, or stainless steel of sufficient strength and properties (e.g., toughness, corrosion resistance, ductility, and the like) to contain the influent and filter media. While concrete and steel are the most common building materials for the walls 45 and bottom surface of the filter cells 30, it will be readily apparent to those of ordinary skill in the art that other materials could be used (e.g., stainless steels, other metals, composites, brick, concrete block, or stone). Regardless of the material chosen, the walls 45, 50, and 55 and bottom surface should be substantially water tight to minimize leakage out of the filter bed 25 or between cells 30. In addition, the walls 45, 50, and 55 must be able to contain the internal hydrostatic pressure created by the influent contained within the cells 30.

The control column 60 and the distribution box 35 may be assembled together to form an integrated piece. The single integrated piece is then assembled into the filter 25. In other embodiments, the control column 60 is first placed into the filter 25 and then the distribution box 35 is mated to the control column 60 such that it is at least partially supported by the control column 60. In still other embodiments, the control column 60 and distribution box 35 are separate components that do not attach to one another.

FIG. 1 illustrates a filter having four filter cells 30 with each cell 30 sharing two walls with the adjacent cells 30. Other embodiments employ a circular filter having wedge shaped filter cells. In these embodiments, the dividing walls radiate out from the center of the filter. Yet another embodiment employs a filter 25 using a plurality of completely separate cells. No walls between cells are shared. It will be apparent to those of ordinary skill in the art that the actual arrangement and construction of the filter cells 30 is not critical to the operation of the invention.

The distribution box 35 illustrated in FIG. 1 sits down in an area where the transverse 50 and lateral 55 walls intersect. The distribution box receives a flow of influent from the inlet flume 40 and evenly divides that flow to the active filter cells 30. Influent can come from many sources (e.g., wastewater, process chemicals, or runoff) but generally comprises water and contaminates to be filtered. Filtrate on the other hand, is defined as the end product that remains, generally water, following the filtering process.

Figure 2:
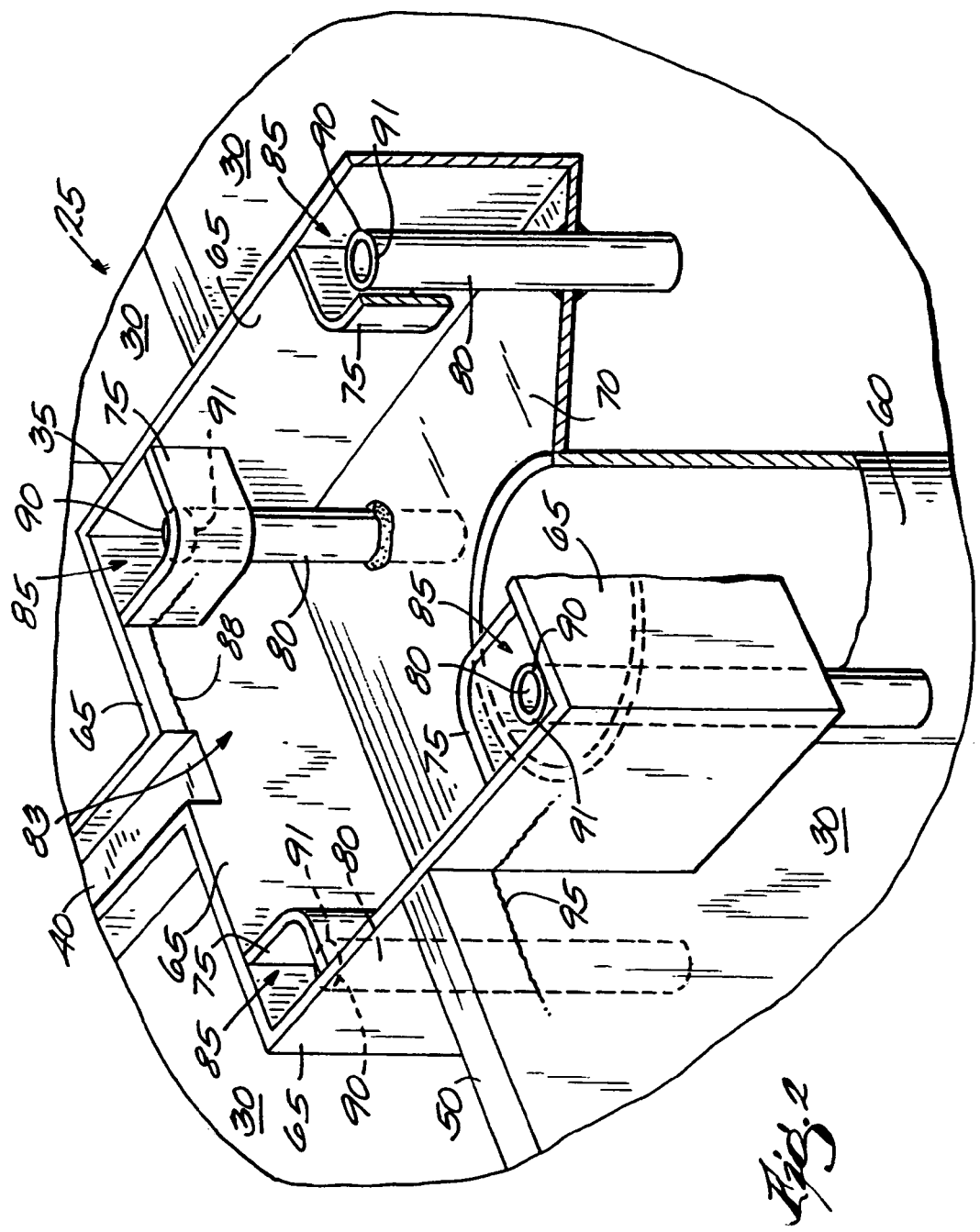
FIG. 2 is a perspective view of the distribution box of FIG. 1.

Referring to FIG. 2, the distribution box 35 includes walls 65, a base 70, stilling baffles 75, drop pipes 80, and an inlet flume 40. The four outer walls 65 and the base 70 of the distribution box 35 define a holding chamber 83 to receive and contain influent. The inlet flume 40 channels a flow of influent into the distribution box 35, at least partially filling the holding chamber 83. Four stilling baffles 75 divide the chamber into four distribution cells 85. The stilling baffles 75 attach to the walls 65 of the distribution box 35 and extend from a level above the maximum influent level 88 of the distribution box 35 to a level below the minimum influent level. The stilling baffles 75 do not extend to the base 70 of the distribution box 35, thereby allowing influent to flow under them to maintain an equal influent level within each distribution cell 85. The drop pipes 80 are disposed between the distribution box walls 65 and the stilling baffles 75. The stilling baffles 75 separate the inlet flume 40 from the drop pipes 80 reducing surface disturbances caused by the inlet flow from propagating to the drop pipes 80.

Figure 4:
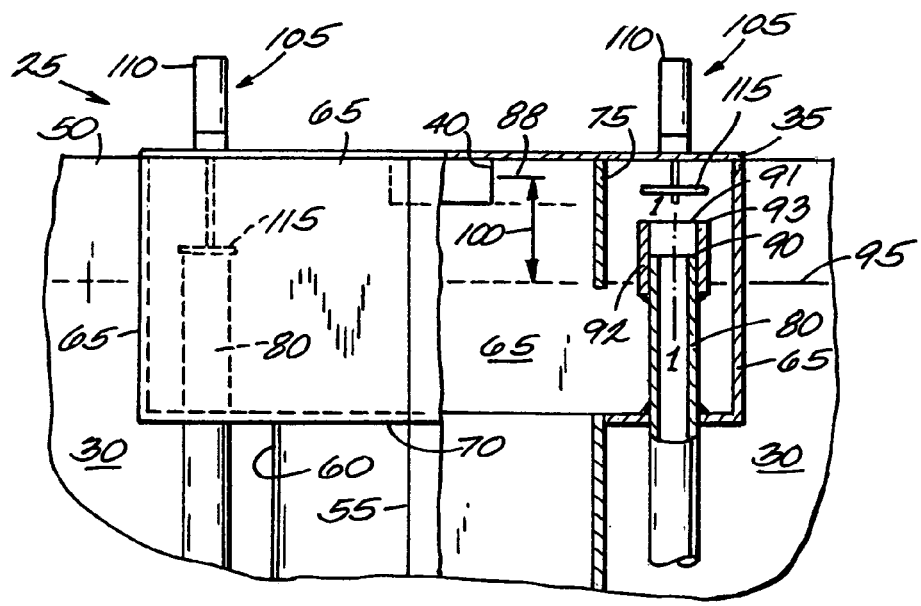
FIG. 4 is a cross sectional view of the distribution box and filter cell arrangement of FIG. 3 taken along line 4—4.
Figure 5:
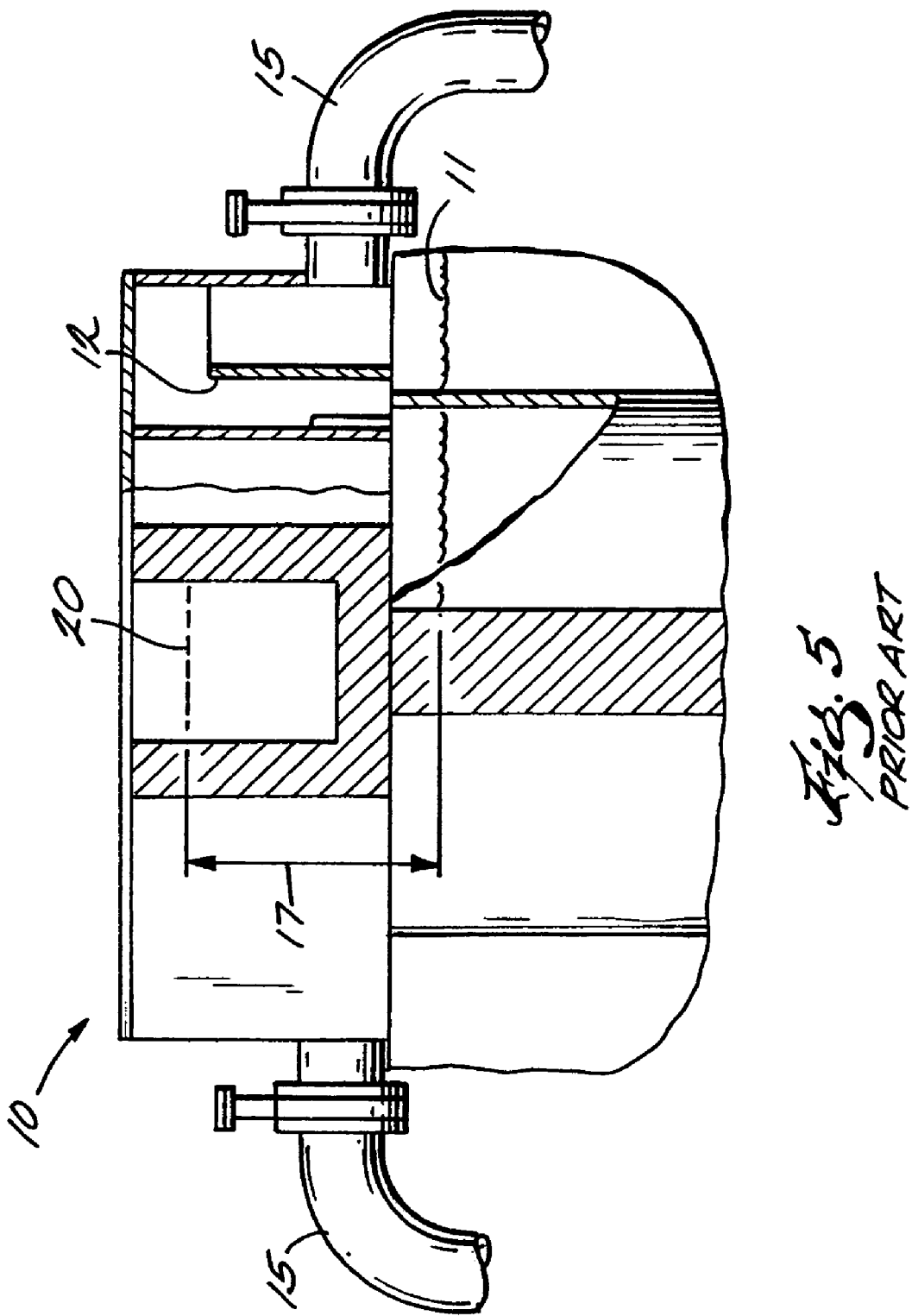
FIG. 5 is a side view of a prior art distribution box and filter cell arrangement.

The drop pipes 80 are open-ended pipes, each in fluid communication with one of the filter cells 30. The tops 90 of the pipes 80 define continuous weir edges 91 receiving a flow of influent from the distribution box 35 and channeling it to a filter cell 30. The vertical position of the drop pipe 80 within the distribution box 35 is adjustable, allowing the drop pipes 80 to accommodate a variety of influent levels. Generally, the level of the drop pipe 80 is set for the particular flow capacity of the filter cells 30 at assembly and remains fixed. However, periodic adjustments during the life of the filter 25 are possible. An example of an adjustable drop pipe 80 is illustrated in FIG. 4. The adjustable drop pipe 80 of FIG. 4 includes a drop pipe 80 and an adjusting sleeve 92. The adjusting sleeve 92 is free to move vertically along the longitudinal axis 1—1 defined by the centerline of the drop pipe 80. During the initial set-up of the filter 25 the position of the adjusting sleeve 92 is finalized. The adjusting sleeve uppermost edge 93, when positioned properly, defines a continuous weir at its top rim at the desired elevation. Once positioned, the movable adjusting sleeve 92 can be fixedly attached using any suitable method (e.g., pinning, welding, soldering, brazing, bolting, screwing, staking and the like). In another embodiment (not shown), the mating walls of two pipes similar to those of FIG. 4 are threaded to allow easy adjustment. Once positioned, a setscrew may be used to lock the position of the outer pipe relative to the inner pipe.

The drop pipes 80 are sized to allow passage of the maximum rated flow of the filter 25, while maintaining the continuous weir 91 at the inlet of the drop pipe 80 and relatively constant low flow velocities within the pipe 80. In general, the water level above the weir 91 must be less than the radius of the pipe to maintain a free surface into the pipe. In addition, the pipe size (diameter) allows for a stable continuous weir 91 even under worst case operating conditions, or when a filter cell 30 is out of service. For example, when a filter cell 30 is taken out of service (i.e., one of the pipes 80 is closed), the distribution box 35 must adjust and distribute the flow evenly to the remaining active cells 30. Under these conditions, additional flow will pass over the continuous weirs 91 of those pipes that remain open. However, the remaining open pipes 80 will be capable of passing that flow without significant flow losses, while maintaining the continuous weir 91 because they are sized appropriately.

The drop pipes 80 thus equally divide the flow among the active filter cells 30 and convey that flow to the filter cells 30. Because the pipes 80 are sized and shaped to produce a continuous weir 91 at the inlet, regardless of the flow rate into the distribution box 35, an equal amount of flow will pass through each equally sized pipe 80 no matter the influent level within the filter cell 30.

It should be noted that the term "pipe," as used herein, is not limited to round, hollow pipes, but should instead be read to include any closed-shaped duct or device capable of channeling a fluid from one point to another. For example, a square duct having an open end disposed within one of the distribution cells 85 and a second end in fluid communication with one of the filter cells 30 would be considered a drop pipe for purposes of this invention. In addition, there is no requirement that the drop pipe be continuous and uninterrupted. For example, one embodiment of the invention (not shown) uses a first length drop pipe welded to the base 70 of the distribution box 35 such that it surrounds a hole disposed within the base 70. A second length of drop pipe is welded to the opposite side of the base 70 surrounding the same hole. The two lengths of pipe fixed to the base 70 would constitute a drop pipe 80 for purposes of this invention. In another embodiment (also not shown), a valve is disposed within one of the two aforementioned lengths of pipe, or alternatively the closure plate is positioned at the outlet or downstream end of the drop pipe 80. Any conduit or interconnected conduits receiving fluid from the distribution cells 35 and directing that fluid to a filter cell 30 should be considered a drop pipe as that term is used herein.

Figure 3:
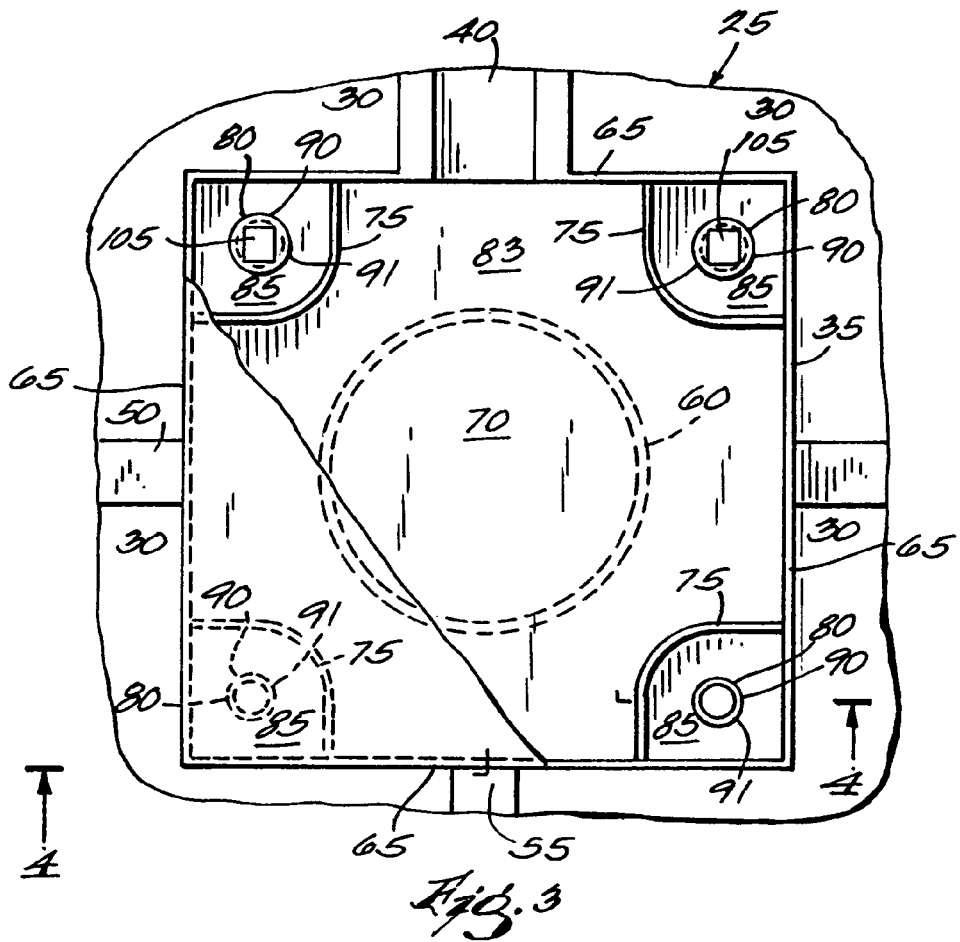
FIG. 3 is a top view of the distribution box of FIG. 1.

Referring to FIG. 3, each of the stilling baffles 75 couples to two walls 65 at a corner of the distribution box 35 to define the distribution cell 85. Disposed within each cell 85 is the top end 90 of a drop pipe 80. In another embodiment (not shown), two stilling baffles extend the full length of one of the walls 65 to define a distribution cell between the stilling baffle and the wall 65. Multiple pipes 80 are able to be disposed within that distribution cell to supply influent to multiple filter cells 30. In another embodiment, a single baffle defines a single distribution cell separated from the inlet flume 40. All of the drop pipes 80 are then disposed within that single distribution cell. As will also be readily understood by those of ordinary skill in the art, multiple drop pipes 80 could be disposed within each distribution cell 85 for the delivery of influent to a single filter cell 30.

FIG. 4 is a side view of the distribution box 35 of FIG. 3, further illustrating the maximum influent level 88 within the distribution box 35 and the maximum influent level 95 within the filter cells 30. The maximum filter cell influent level 95 is approximately the same level as the bottom edge of the stilling baffles 75, while the maximum distribution box level 88 is above the bottom edge of the stilling baffles 75. In order for influent to flow from the distribution box 35 to the filter cells 30, the influent level must be higher in the distribution box 35 than in the filter cell 30. The filter 25 will have a difference 100 between levels 88 and 95 of between four inches and eighteen inches with a difference 100 as low as one inch being possible. In addition, higher differences 100 are possible, including differences as great as sixty inches or greater. Higher level differences 100 have the disadvantage of requiring taller distribution boxes 35 and require that the influent be pumped to a higher level resulting in wasted energy and additional pumping costs.

Valves 105 disposed above the drop pipes 80 function to close the continuous weirs 91 at the top ends 90 of the pipes 80 preventing flow to the filter cells 30 the drop pipes 80 supply. Once actuated, the actuator 110 moves the closure plate 115 into sealing contact with the continuous weir defined by the pipe 80 to prevent influent flow. With this arrangement, flow to any filter cell 30 can be halted without the use of a valve that creates frictional and other flow losses during normal operation. For example, FIG. 4 illustrates two drop pipes 80 supplying two filter cells 30. The valve 105 on the left is closed such that flow cannot pass into the drop pipe 80. The valve 105 on the right is open such that the actuator 110 supports the closure plate 115 above the maximum distribution box influent level 88. The actuator 110, shown above the valves 105, can be any standard actuator 110 (e.g., mechanically-actuated, motor-driven, air-actuated, or hydraulically-actuated and the like) as will be readily understood by those of ordinary skill in the art.

It should be noted that for purposes of description, a filter 25 having four filter cells 30 and a distribution box 35 having four distribution cells 85 has been described. However, one of ordinary skill in the art will realize that the present invention will function with any number of filter cells 30 and distribution cells 85 and is therefore not limited to four.

In addition, the figures included herein illustrate a plurality of filter cells 30 sharing internal walls. The shared internal walls provide at least some suppose for the distribution box 35. It should be understood that filter cells completely separated from one another are in accordance with the present invention, as well as filter cells that share internal walls. Further, there is no requirement that the filter cell walls provide support for the distribution box.

Although the invention has been described in detail with reference to certain preferred embodiments, variations and modifications exist within the scope and spirit of the invention as described and defined in the following claims.

What is claimed is:

1. A method of minimizing head loss in a filter system including a plurality of drop pipes, a plurality of filter cells including a filter media and having a maximum influent level, and a distribution box having a maximum influent level, a base, and a plurality of distribution cells, the method comprising:

positioning a first end of each of the plurality of drop pipes within one of the distribution cells such that the first end of the pipe is disposed within the distribution cell and defines a weir having a weir height;

positioning a second end of each of the pipes in fluid communication with one of the plurality of filter cells; and supporting the distribution box such that the maximum influent level of the filter cells is above the base of the distribution box and below the maximum influent level of the distribution box.

2. A method of minimizing head loss in a filter system including a plurality of drop pipes, a plurality of filter cells including a filter media and having a maximum influent level, and a distribution box having a maximum influent level, a base, and a plurality of distribution cells, the method comprising:

positioning a first end of each of the plurality of drop pipes within one of the distribution cells such that the first end of the pipe is disposed within the distribution cell and defines a weir having a weir height;

positioning a second end of each of the pipes in fluid communication with one of the plurality of filter cells;

supporting the distribution box such that the maximum influent level of the filter cells is above the base of the distribution box and below the maximum influent level of the distribution box;

providing a plurality of adjusting sleeves having an uppermost edge;

coupling each of the adjusting sleeves to one of the plurality of drop pipes; and vertically positioning the adjusting sleeve to define a weir at the uppermost edge.

3. The method of claim 1, further comprising the step of at least partially submerging the distribution box within at least one of the plurality of filter cells such that the maximum influent level of the filter cells is above the base of the distribution box and below the maximum influent level of the distribution box.

4. A method of splitting a flow of influent between a plurality of filter cells including a filter media using a distribution box having a plurality of drop pipes, the method comprising:

disposing a first end of each drop pipe within the distribution box;

positioning the first ends of each drop pipe at a weir height such that the first ends of the drop pipes define a plurality of weirs within the distribution box;

disposing a second end of the pipe in fluid communication with one of the plurality of filter cells;

directing the flow of influent to the distribution box;

simultaneously splitting the flow and distributing the flow by passing a substantially equal portion of flow over each of the weirs, and passing the flow through the plurality of drop pipes to the filter cells.

5. The method of claim 4, further comprising the steps of providing a plurality of movable adjusting sleeves each having an uppermost edge, coupling each adjusting sleeve to the first end of one of the drop pipes, and moving the adjusting sleeve to position the uppermost edge at the weir height.

6. The method of claim 4, further comprising the steps of providing a plurality of closure valves, each selectively engageable with one of the plurality of drop pipes, and selectively engaging one of the closure valves with one of the drop pipes to prevent flow of influent therethrough.

* * * * *